US012387645B2

(12) United States Patent
Lee et al.

(10) Patent No.: US 12,387,645 B2
(45) Date of Patent: Aug. 12, 2025

(54) DISPLAY SYSTEM PROVIDING FRAME DATA ACCORDING TO A RECEIVED SCAN ORDER AND METHOD OF DRIVING THE SAME

(71) Applicant: SAMSUNG DISPLAY CO., LTD., Yongin-si (KR)

(72) Inventors: Donggyu Lee, Yongin-si (KR); Sehyuk Park, Yongin-si (KR); Jin-Wook Yang, Yongin-si (KR); Jae-Hyeon Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 124 days.

(21) Appl. No.: 18/191,542

(22) Filed: Mar. 28, 2023

(65) Prior Publication Data

US 2024/0062694 A1 Feb. 22, 2024

(30) Foreign Application Priority Data

Aug. 17, 2022 (KR) ........................ 10-2022-0102563

(51) Int. Cl.
*G09G 3/20* (2006.01)

(52) U.S. Cl.
CPC ....... *G09G 3/20* (2013.01); *G09G 2310/0264* (2013.01); *G09G 2340/0435* (2013.01)

(58) Field of Classification Search
CPC ............. G09G 3/20; G09G 2310/0264; G09G 2340/0435
See application file for complete search history.

(56) References Cited

U.S. PATENT DOCUMENTS 6,774,868 B1 * 8/2004 Bowen .................. G09G 5/393 345/1.3
8,345,052 B1 * 1/2013 Diard ........................ G06T 1/60 345/502
9,401,128 B1 * 7/2016 Jepsen .................... G06F 3/013
2003/0189568 A1 * 10/2003 Alkouh ................... G06T 15/50 345/422
2005/0116911 A1 * 6/2005 Mukai ...................... G09G 3/20 345/89
2009/0021519 A1 * 1/2009 Yusa .................... G09G 3/3688 345/536
2011/0292060 A1 * 12/2011 Chambers ............ G06F 1/1647 345/545
2012/0108331 A1 * 5/2012 Dietrich, Jr. .......... H04L 65/611 463/31
2012/0127145 A1 * 5/2012 Jang ......................... G09G 3/20 345/204
2014/0184601 A1 * 7/2014 Dunaisky .............. G09G 5/393 345/424

(Continued)

FOREIGN PATENT DOCUMENTS

KR 10-2002-0029631 4/2002
KR 10-2004-0031726 4/2004
KR 10-2020-0040052 4/2020

*Primary Examiner* — Sejoon Ahn
(74) *Attorney, Agent, or Firm* — F. CHAU & ASSOCIATES, LLC

(57) ABSTRACT

A display system includes a host processor configured to provide frame data using a scan order, and a display device including a display panel including pixels and a display panel driver configured to refresh the pixels according using the frame data and to provide the scan order to the host processor.

21 Claims, 13 Drawing Sheets

(56) References Cited

U.S. PATENT DOCUMENTS

| | | | | |
|---|---|---|---|---|
| 2014/0184619 | A1* | 7/2014 | Kim | G06T 1/20 345/519 |
| 2015/0181084 | A1* | 6/2015 | Colenbrander | H04N 23/64 348/99 |
| 2015/0187298 | A1* | 7/2015 | Eom | G09G 3/3266 345/99 |
| 2015/0264298 | A1* | 9/2015 | Colenbrander | G09G 5/001 345/547 |
| 2016/0267865 | A1* | 9/2016 | Brown | G09G 3/3677 |
| 2017/0025068 | A1* | 1/2017 | Jeoung | G09G 3/3266 |
| 2018/0183947 | A1* | 6/2018 | Song | H04N 1/00233 |
| 2018/0304151 | A1* | 10/2018 | Hicks | G09G 5/395 |
| 2019/0089927 | A1* | 3/2019 | Yadav | G06T 1/60 |
| 2019/0206369 | A1* | 7/2019 | Kempf | G06F 1/163 |
| 2020/0243033 | A1* | 7/2020 | Slavenburg | G09G 3/3674 |
| 2020/0410942 | A1* | 12/2020 | Kim | G09G 3/3291 |
| 2021/0056719 | A1* | 2/2021 | Li | G06T 3/18 |
| 2021/0104191 | A1* | 4/2021 | Lee | G09G 3/20 |
| 2021/0319755 | A1* | 10/2021 | Kim | G09G 3/3233 |
| 2022/0084481 | A1* | 3/2022 | Manepalli | G09G 5/001 |
| 2022/0093057 | A1* | 3/2022 | Glen | G09G 5/006 |
| 2022/0093062 | A1* | 3/2022 | Glen | G09G 5/363 |

* cited by examiner

DISPLAY SYSTEM PROVIDING FRAME DATA ACCORDING TO A RECEIVED SCAN ORDER AND METHOD OF DRIVING THE SAME

CROSS-REFERENCE TO RELATED APPLICATIONS

This application claims priority under 35 U.S.C. § 119 to Korean Patent Application No. 10-2022-0102563, filed on Aug. 17, 2022 in the Korean Intellectual Property Office KIPO, the disclosure of which is herein incorporated by reference in its entirety.

TECHNICAL FIELD

Embodiments of the present inventive concept relate to a display system and a method of driving the display system. More particularly, embodiments of the present inventive concept relate to a display system including a display device and a host processor and a method of driving the display system.

DISCUSSION OF RELATED ART

A display system may include a host processor that provides frame data to a display device, and the display device may display an image based on the frame data.

Generally, the display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

Also, when refreshing an image displayed by the display panel, the host processor may sequentially provide the frame data to the display device for refreshing lines of the display panel top-to-bottom. In such a case there is no problem when the display device refreshes the image beginning with the top line of the display panel, but when the display device does not refresh the image beginning with the top line of the display panel, latency in the display of the image may occur until the frame data corresponding to a line to be displayed is received by the display device.

SUMMARY

Embodiments of the present inventive concept provide a display system that provides frame data to a display device according to a scan order.

Embodiments of the present inventive concept also provide a method of driving the display system.

According to embodiments of the present inventive concept, a display system may include a host processor configured to provide frame data using a scan order, and a display device including a display panel including pixels and a display panel driver configured to refresh the pixels using the frame data and to provide the scan order to the host processor.

In an embodiment, the host processor may be configured to sequentially provide the frame data to the display panel driver according to an output order corresponding to the scan order.

In an embodiment, the scan order includes a center pixel row first among pixel rows including the pixels.

In an embodiment, the display panel driver may be configured to alternately refresh the pixel rows in a first scan direction and the pixel rows in a second scan direction opposite to the first scan direction relative to the center pixel row.

In an embodiment, the display panel driver may include a gate driver connected to gate lines and including a plurality of stages configured to sequentially apply gate signals to refresh the pixels of the gate lines in response to a scan start signal.

In an embodiment, the scan start signal may be applied to a center stage among the stages.

In an embodiment, the stages in a first scan direction and the stages in a second scan direction opposite to the first scan direction relative to the center stage may be configured to alternately output the gate signals to refresh the pixels.

In an embodiment, the display system includes a frame buffer, wherein the host processor may be configured to perform a rendering to generate the frame data and to store the frame data to the frame buffer.

In an embodiment, the host processor may be configured to sequentially provide the frame data stored in the frame buffer to the display panel driver in an output order corresponding to the scan order.

In an embodiment, the display device may be configured to synchronize a driving frequency of the display device with a rendering frequency of the host processor.

According to embodiments of the present inventive concept, a method of driving a display system may include performing a rendering to generate frame data in a host processor, providing a scan order of a display device to the host processor, providing the frame data to the display device using the scan order, and refreshing pixels of the display device according to the scan order.

In an embodiment, wherein providing the frame data may include sequentially providing the frame data to the display device according to an output order corresponding to the scan order.

In an embodiment, the display device may be configured to first refresh a center pixel row among a plurality of pixel rows of the display device.

In an embodiment, the display device may be configured to alternately refresh the pixel rows in a first scan direction and the pixel rows in a second scan direction opposite to the first scan direction relative to the center pixel row.

In an embodiment, the display device may include a gate driver connected to gate lines and including a plurality of stages sequentially applying gate signals to refresh the pixels of the gate lines in response to a scan start signal.

A method according to an embodiment of the present inventive concept may include applying the scan start signal to a center stage among the stages.

In an embodiment, the stages in a first scan direction and the stages in a second scan direction opposite to the first scan direction relative to the center stage may alternately output the gate signals to refresh the pixels.

In an embodiment, the host processor may be configured to perform a rendering to generate the frame data and to store the frame data to a frame buffer.

In an embodiment, the host processor may be configured to sequentially provide the frame data stored in the frame buffer to the display device in an output order corresponding to the scan order.

In an embodiment, the display device may be configured to synchronize a driving frequency of the display device with a rendering frequency of the host processor.

In an embodiment, a display system comprising a host processor having an output controller configured to receive a scan order and generate an output control signal using the scan order, and a frame buffer to store frame data, wherein an output of the frame data by frame buffer is controlled by the output controller using the output control signal.

Therefore, the display system may provide frame data to a display device according to a scan order by including the display device including a display panel including pixels and a display panel driver refreshing the pixels according to the scan order and providing the scan order to a host processor, and the host processor providing the frame data to the display panel driver using the scan order. Accordingly, the display system may reduce a display latency. Embodiments of the present inventive concept are not limited by the foregoing, and it will be understood by those of ordinary skill in the art that various changes in form and details may be made thereto without departing from the spirit and scope of the present inventive concept.

BRIEF DESCRIPTION OF THE DRAWINGS

The above and other aspects and features of embodiments of the present inventive concept will be more apparent from the following description taken in conjunction with the accompanying drawings, in which.

DETAILED DESCRIPTION

Hereinafter, embodiments of the present inventive concept will be explained in detail with reference to the accompanying drawings.

Figure 1:
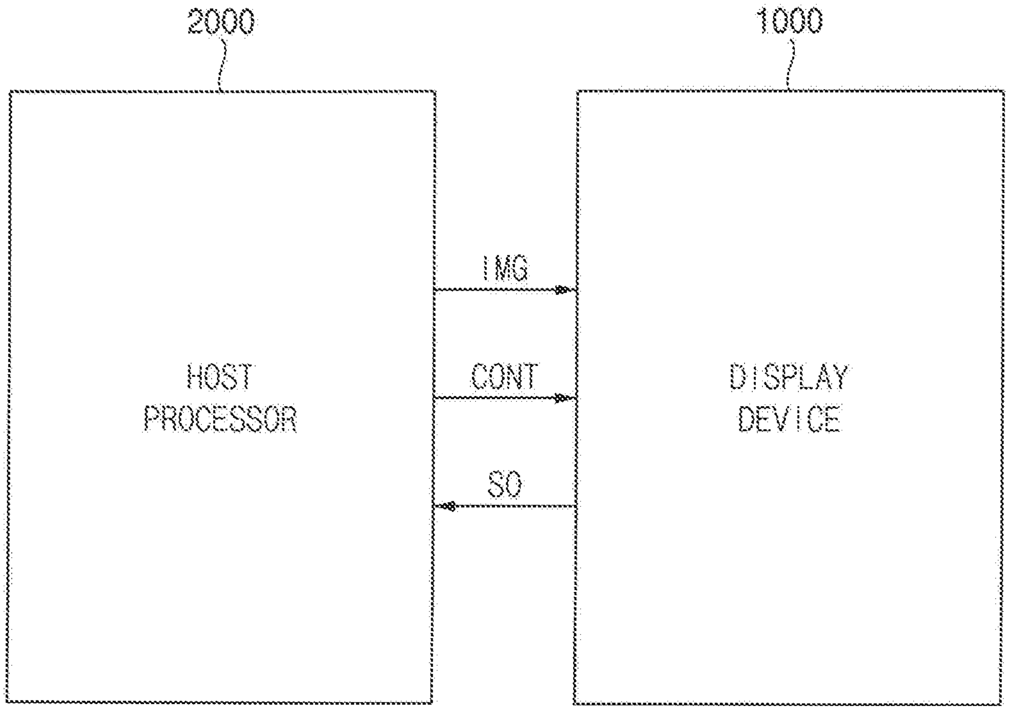
FIG. 1 is a block diagram illustrating a display system according to embodiments of the present inventive concept.

FIG. 1 is a block diagram illustrating a display system according to embodiments of the present inventive concept.

Referring to FIG. 1, the display system may include a display device 1000 and a host processor 2000.

The display device 1000 may receive data including frame data IMG for an image from the host processor 2000 and display the image using the data for the image. For example, the display device 1000 may be an electronic device that displays the image.

The host processor 2000 may provide the data for the image to the display device 1000. For example, the host processor may be a graphics processing unit (GPU).

Details of the display device 1000 and the host processor 2000 are described herein.

Figure 2:
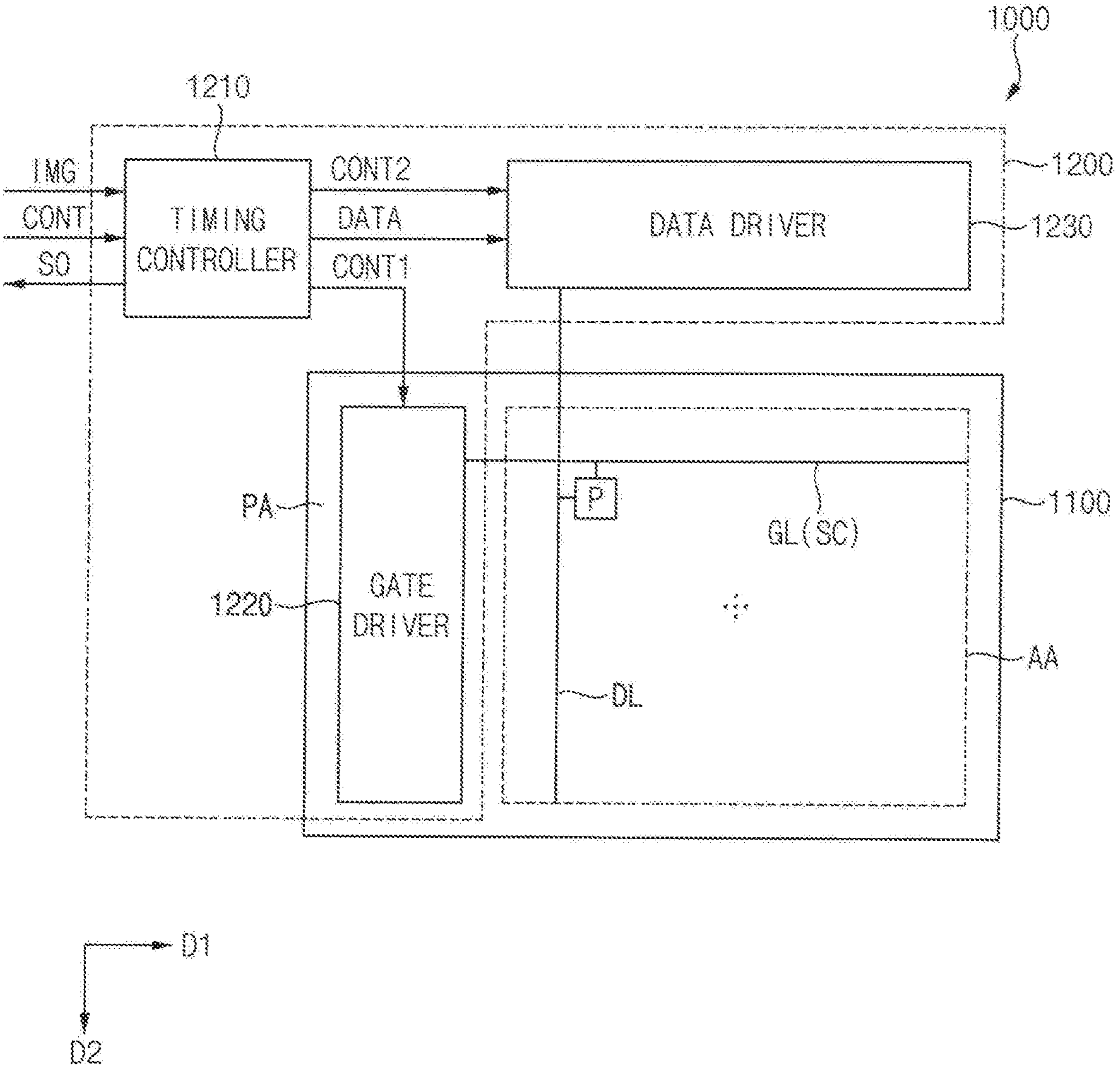
FIG. 2 is a block diagram illustrating an example of a display device of the display system of FIG. 1.

FIG. 2 is a block diagram illustrating an example of a display device of the display system of FIG. 1.

Referring to FIGS. 1 and 2, the display device may include a display panel 1100 and a display panel driver 1200. The display panel driver 1200 may include a timing controller 1210, a gate driver 1220, and a data driver 1230. In an embodiment, the timing controller 1210 and the data driver 1230 may be integrated into one chip. In an embodiment, the timing controller 1210 and the data driver 1230 may be implemented on different chips.

The display panel 1100 has a display region AA on which an image may be displayed and a peripheral region PA adjacent to the display region AA. In an embodiment, the gate driver 1220 may be mounted on the peripheral region PA of the display panel 1100.

The display panel 1100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 1210 may receive frame data IMG and an input control signal CONT from a host processor such as a GPU. The frame data IMG may include data for controlling the pixels. For example, the frame data IMG may include red image data, green image data and blue image data. In an embodiment, the frame data IMG may further include white image data. In at least one example, the frame data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 1210 may generate a first control signal CONT1, a second control signal CONT2, and data signal DATA based on the frame data IMG and the input control signal CONT.

The timing controller 1210 may generate the first control signal CONT1 for controlling operation of the gate driver 1220 based on the input control signal CONT. The timing controller 1210 may output the first control signal CONT1 to the gate driver 1220. The first control signal CONT1 may include a vertical start signal and a gate clock signal.

The timing controller 1210 may generate the second control signal CONT2 for controlling operation of the data driver 1230 based on the input control signal CONT. The timing controller 1210 may output the second control signal CONT2 to the data driver 1230. The second control signal CONT2 may include a horizontal start signal and a load signal.

The timing controller 1210 may receive the frame data IMG and the input control signal CONT, and generate the data signal DATA. The timing controller 1210 may output the data signal DATA to the data driver 1230.

The gate driver 1220 may generate gate signals for driving the gate lines GL in response to the first control signal CONT1 input from the timing controller 1210. The gate driver 1220 may output the gate signals, which may be a scan signal (SC), to the gate lines GL. For example, the gate driver 1220 may sequentially output the gate signals to the gate lines GL.

The data driver 1230 may receive the second control signal CONT2 and the data signal DATA from the timing controller 1210. The data driver 1230 may convert the data signal DATA into analog data voltages. The data driver 1230 may output the analog data voltages to the data lines DL.

Figure 3:
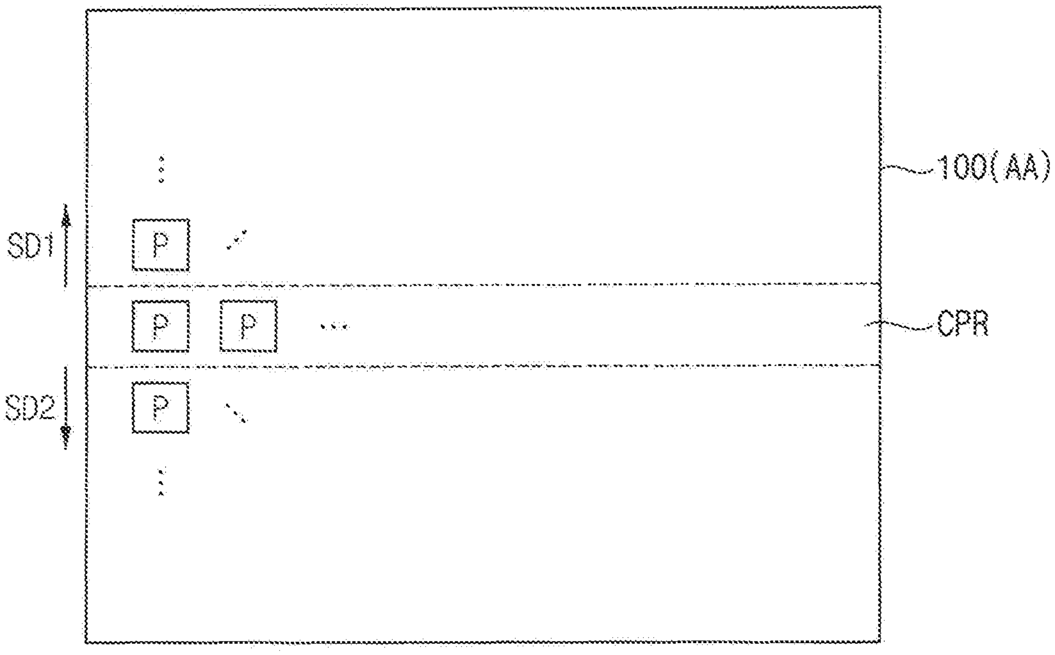
FIG. 3 is a diagram illustrating an example of a display panel of the display system of FIG. 1.
Figure 4:
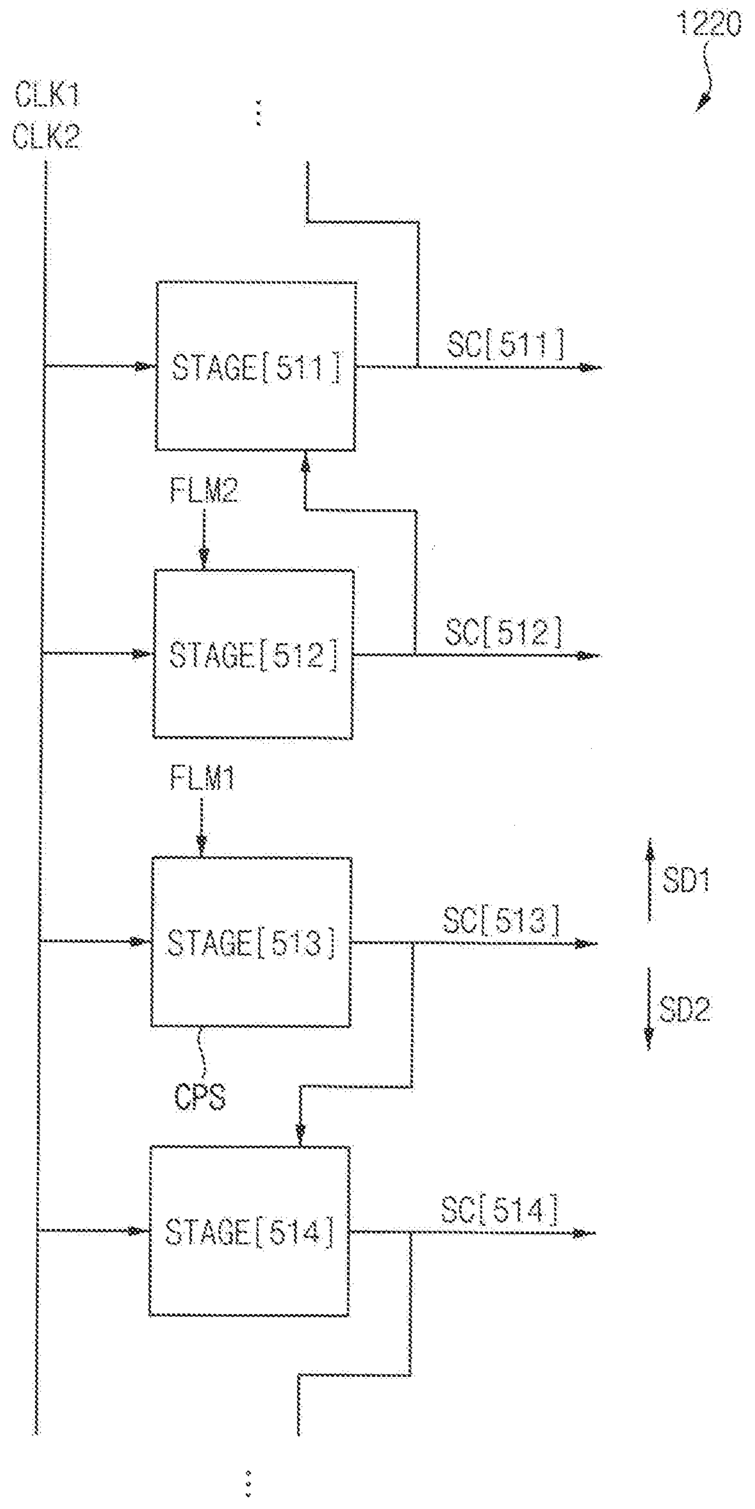
FIG. 4 is a diagram illustrating an example of a gate driver of the display system of FIG. 1.
Figure 5:
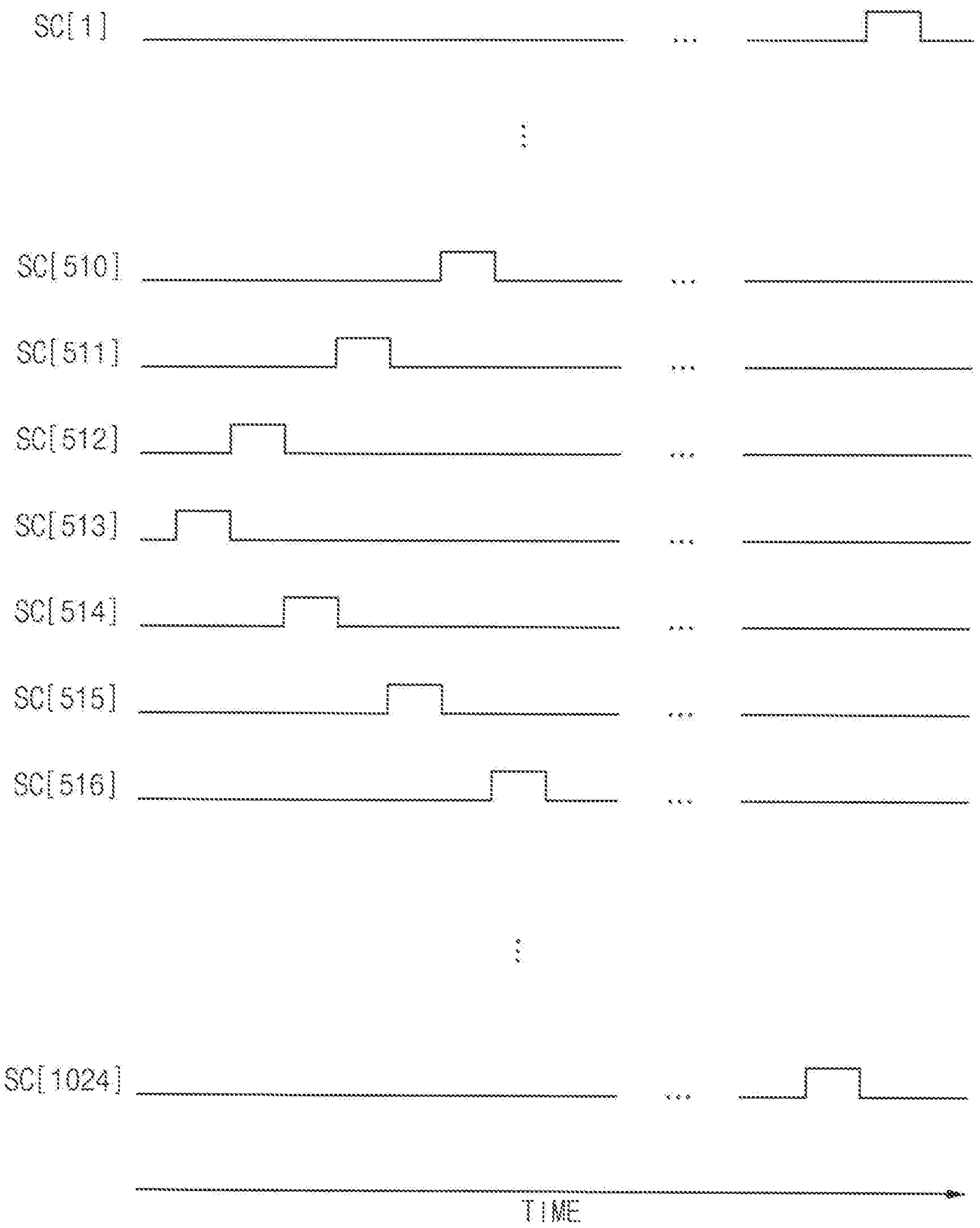
FIG. 5 is a diagram illustrating an example of a scan signal of the display system of FIG. 1.

FIG. 3 is a diagram illustrating an example of the display panel 1100 of the display system of FIG. 1. FIG. 4 is a diagram illustrating an example of the gate driver 1220 of the display system of FIG. 1. FIG. 5 is a diagram illustrating an example of the scan signal SC of the display system of FIG. 1. FIGS. 4 and 5 show embodiments of the display panel 1100 including 1024 pixel rows, where a center pixel row CPR is a 513th pixel row of the pixel rows. Each pixel row may include a plurality of pixels Referring to FIGS. 2 to 5, the display panel driver 1200 may refresh the pixel rows according to a scan order. In an embodiment, the display panel driver 1200 may first refresh the center pixel row CPR among the pixel rows.

For example, the display panel driver 1200 may provide the scan signals SC to pixels P of the pixel rows. The data voltages may be written to the pixels P in response to the scan signal SC. That is, the pixels P may be refreshed in response to the scan signal SC.

Referring to FIGS. 2 and 4, the center pixel row CPR may be a middle pixel row among the pixel rows forming the display region AA. For example, in an embodiment in which the display panel 1100 includes 1024 pixel rows, the center pixel row CPR may be a 513th pixel row. In an embodiment in which the number of the pixel rows is even, the center pixel row CPR may be one of two middle pixel rows.

A user looking at the display panel 100 may concentrate a gaze on a center region of the display panel 100. By refreshing the center pixel row CPR first, the display device 1000 may refresh an image to anticipate the gaze of the user at the center region of the display panel 100.

The display panel driver may alternately refresh the pixel rows in a first scan direction SD1 and the pixel rows in a second scan direction SD2 opposite to the first scan direction SD1. The first scan direction SD1 and the second scan direction SD2 may be relative to, and away from, the center pixel row CPR.

For example, the scan signal SC may be first applied to the center pixel row CPR, and the scan signal SC may be alternately applied to the pixel rows in the first scan direction SD1 and the pixel rows in the second scan direction SD2 beginning with pixels rows adjacent to the center pixel row CPR. Further, for example, the pixels rows receiving the scan signal SC in the first scan direction SD1 are sequentially farther away from the center pixel row CPR, and the pixels rows receiving the scan signal SC in the second scan direction SD2 are sequentially farther away from the center pixel row CPR.

The gate driver 1220 may be connected to the gate lines GL and include a plurality of stages (STAGE[1], . . . , STAGE[511], STAGE[512], STAGE[513], STAGE[514], . . . , STAGE[1024]) sequentially applying the gate signals (e.g., the scan signal SC) to refresh the pixels P of the gate lines GL in response to a scan start signal.

The scan start signal may include a first scan start signal FLM1 and a second scan start signal FLM2. For example, a phase of the second scan start signal FLM2 may be later than that of the first scan start signal FLM1. For example, the second scan start signal FLM2 may have a phase difference from the first scan start signal FLM1 of 1 horizontal time unit. For example, the horizontal time unit may be a time sufficient for the pixels of a pixel line to be refreshed.

The first scan start signal FLM1 may be applied to a center stage CPS among the stages (STAGE[1], . . . , STAGE[511], STAGE[512], STAGE[513], STAGE[514], . . . , STAGE[1024]). The stages in the first scan direction SD1 (e.g., STAGE[1], . . . , STAGE[511], STAGE[512]) and the stages in the second scan direction SD2 (e.g., STAGE[514], . . . , STAGE[1024]) opposite to the first scan direction SD1 relative to the center stage CPS may alternately output the gate signals (i.e., the scan signal SC) to refresh the pixels P of respective lines.

For example, the stage STAGE[513] connected to a 513th pixel row may output a 513th scan signal SC[513] in response to the first scan start signal FLM1.

For example, after the 513th scan signal SC[513] is output, the stage STAGE[512] connected to a 512th pixel row may output a 512th scan signal SC[512] in response to the second scan start signal FLM2, which is later in time than the first scan start signal FLM1 by 1 horizontal time unit.

For example, the first scan start signal FLM1 and the second scan start signal FLM2 may initialize a scan order illustrated in FIG. 5 in which the 513th scan signal SC[513] may be output, followed by the 512th scan signal SC[512], followed by the 514th scan signal SC[514], followed by the 511th scan signal SC[511], in an order such that the scan signal SC may be alternately applied to the pixel rows in the first scan direction SD1 and the pixel rows in the second scan direction SD2.

For example, after the 512th scan signal SC[512] is output, the stage STAGE[514] connected to a 514th pixel row may output a 514th scan signal SC[514] in response to the 513th scan signal SC[513]. In an embodiment, since the 514th scan signal SC[514] is output after the 512th scan signal SC[512] is output rather then immediately after the 513th scan signal SC[513] is output, the 513th scan signal SC[513] may be delayed through a buffer and the delayed 513th scan signal SC[513] may be applied to the stage STAGE[514] connected to the 514th pixel row after the 512th scan signal SC[512] is output. In an embodiment, since the 514th scan signal SC[514] is not output immediately after the 513th scan signal SC[513] is output, the display device 1000 may delay the 514th scan signal SC[514] from being output by using a clock signal. For example, the clock signal may include a first clock signal CLK1 and a second clock signal CLK2. The phases of the first clock signal CLK1 and the second clock signal CLK2 may be different. For example, phases of the first clock signal CLK1 and the second clock signal CLK2 may be opposite one another.

For example, after a 514th scan signal SC[514] is output, the stage STAGE[511] connected to a 511th pixel row may output a 511th scan signal SC[511] in response to the 512th scan signal SC[512]. In an embodiment, since the 511th scan signal SC[511] is output after the 514$^{th}$ scan signal SC[514] is output rather then immediately after the 512th scan signal SC[512] is output, the 512th scan signal SC[512] may be delayed through the buffer and the delayed 512th scan signal SC[512] may be applied to the stage STAGE[511] connected to the 511th pixel row after the 514th scan signal SC[514]

is output. In an embodiment, since the 511th scan signal SC[511] is not output immediately after the 512th scan signal SC[512] is output, the display device 1000 may delay the 511th scan signal SC[511] from being output by using the clock signal, such as the first clock signal CLK1 and the second clock signal CLK2.

Accordingly, the pixel rows in the first scan direction SD1 and the pixel rows in the second scan direction SD2 may be alternately refreshed.

Figure 6:
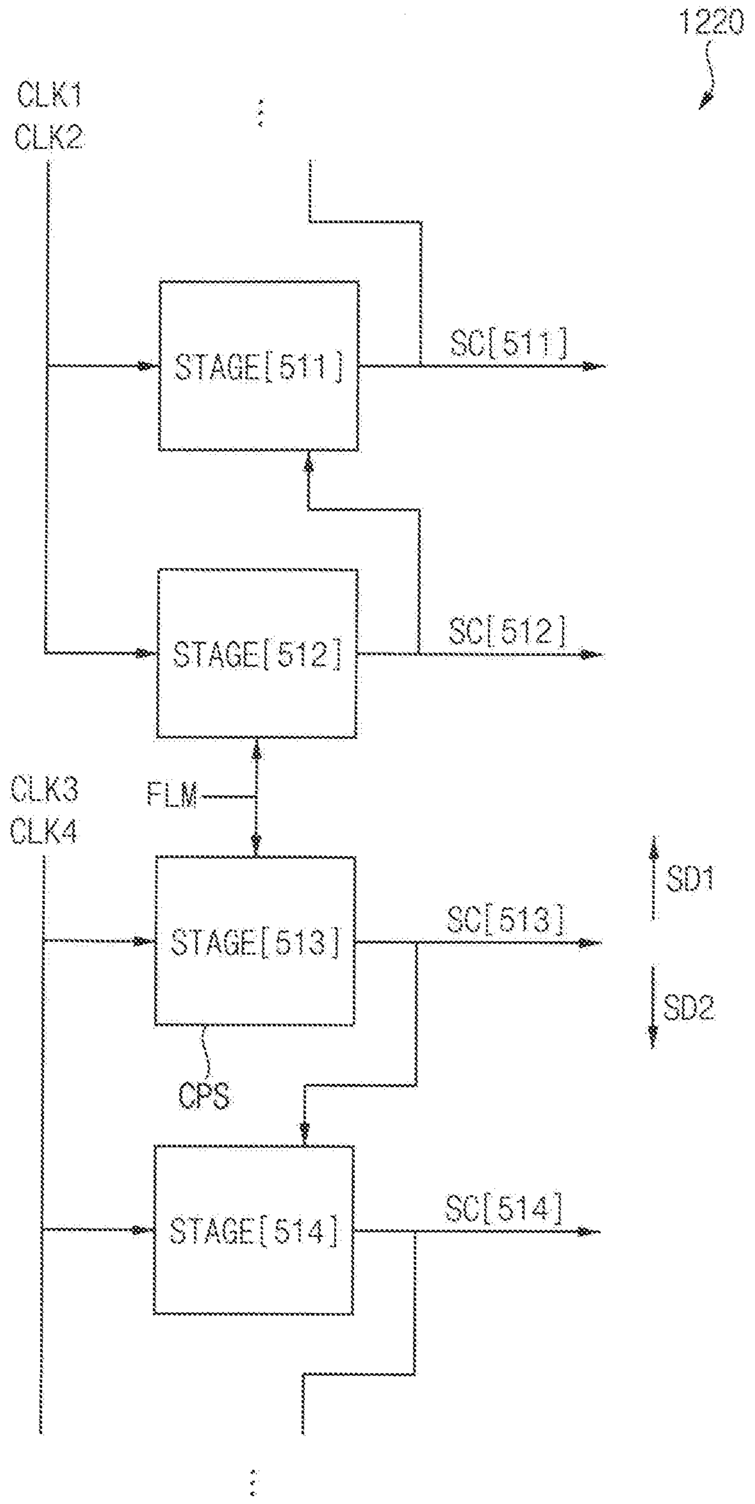
FIG. 6 is a diagram illustrating an example of a gate driver of a display system according to embodiments of the present inventive concept.

FIG. 6 is a diagram illustrating an example of the gate driver 1220 of the display system according to embodiments of the present inventive concept.

The display system referred to with reference to FIG. 6 is substantially the same as the display system of FIG. 1 except for the gate driver 1220. Thus, the same reference numerals are used to refer to the same or similar element, and any repetitive explanation will be omitted.

Referring to FIGS. 2, 5, and 6, the gate driver 1220 may be connected to the gate lines GL and include the plurality of stages (STAGE[1], . . . , STAGE[511], STAGE[512], STAGE[513], STAGE[514], . . . , STAGE[1024]) sequentially applying the gate signals (e.g., the scan signal SC) to refresh the pixels P of the gate lines GL in response to the scan start signal FLM. For example, one pixel row may be connected to one gate line GL.

The scan start signal FLM may be applied to the center stage CPS among the stages (STAGE[1], . . . , STAGE[511], STAGE[512], STAGE[513], STAGE[514], . . . , STAGE [1024]). The stages in the first scan direction SD1 (e.g., STAGE[1], . . . , STAGE[511], STAGE[512]) and the stages in the second scan direction SD2 (e.g., STAGE[514], . . . , STAGE[1024]) opposite to the first scan direction SD1 relative to the center stage CPS may alternately output the gate signals (i.e., the scan signal SC) to refresh the pixels P of respective lines. For example, the center stage CPS may be a stage connected to the center pixel row CPR (i.e., STAGE[513]).

The stages in the first scan direction SD1 (e.g., STAGE [1], . . . , STAGE[511], STAGE[512]) may receive the first clock signal CLK1 and the second clock signal CLK2 to output the scan signal SC. The stages in the second scan direction SD2 (e.g., STAGE[514], . . . , STAGE[1024]) may receive a third clock signal CLK3 and a fourth clock signal CLK4 to output the scan signal SC. The first clock signal CLK1 may have a different phase from the third clock signal CLK3, and the second clock signal CLK2 may have a different phase from the fourth clock signal CLK4.

As such, the stages in the first scan direction SD1 (e.g., STAGE[1], . . . , STAGE[511], STAGE[512]) and the stages in the second scan direction SD2 (e.g., STAGE[514], . . . , STAGE[1024]) may output different scan signals SC in response to the same scan start signal FLM by receiving clock signals having different phases.

For example, the stage STAGE[513] connected to the 513th pixel row may output the 513th scan signal SC[513] in response to the scan start signal FLM.

For example, after the 513th scan signal SC[513] is output, the stage STAGE[512] connected to the 512th pixel row may output the 512th scan signal SC[512] in response to the start signal FLM.

For example, after the 512th scan signal SC[512] is output, the stage STAGE[514] connected to the 514th pixel row may output the 514th scan signal SC[514] in response to the 513th scan signal SC[513]. In an embodiment, since the 514th scan signal SC[514] is output after the 512th scan signal SC[512] is output rather then immediately after the 513th scan signal SC[513] is output, the 513th scan signal SC[513] may be delayed through a buffer and the delayed 513th scan signal SC[513] may be applied to the stage STAGE[514] connected to the 514th pixel row after the 512th scan signal SC[512] is output. In an embodiment, since the 514th scan signal SC[514] is not output immediately after the 513th scan signal SC[513] is output, the display device 1000 may delay the 514th scan signal SC[514] from being output by using the first clock signal CLK1 and the second clock signal CLK2.

For example, after the 514th scan signal SC[514] is output, the stage STAGE[511] connected to the 511th pixel row may output the 511th scan signal SC[511] in response to the 512th scan signal SC[512]. In an embodiment, since the 511th scan signal SC[511] is output after the 514th scan signal SC is output rather then immediately after the 512th scan signal SC[512] is output, the 512th scan signal SC[512] may be delayed through the buffer and the delayed 512th scan signal SC[512] may be applied to the stage STAGE [511] connected to the 511th pixel row after the 514th scan signal SC[514] is output. In an embodiment, since the 511th scan signal SC[511] is not output immediately after the 512th scan signal SC[512] is output, the display device 1000 may delay the 511th scan signal SC[511] from being output by using the third clock signal CLK3 and the fourth clock signal CLK4.

Accordingly, the pixel rows in the first scan direction SD1 and the pixel rows in the second scan direction SD2 may be alternately refreshed.

Figure 7:
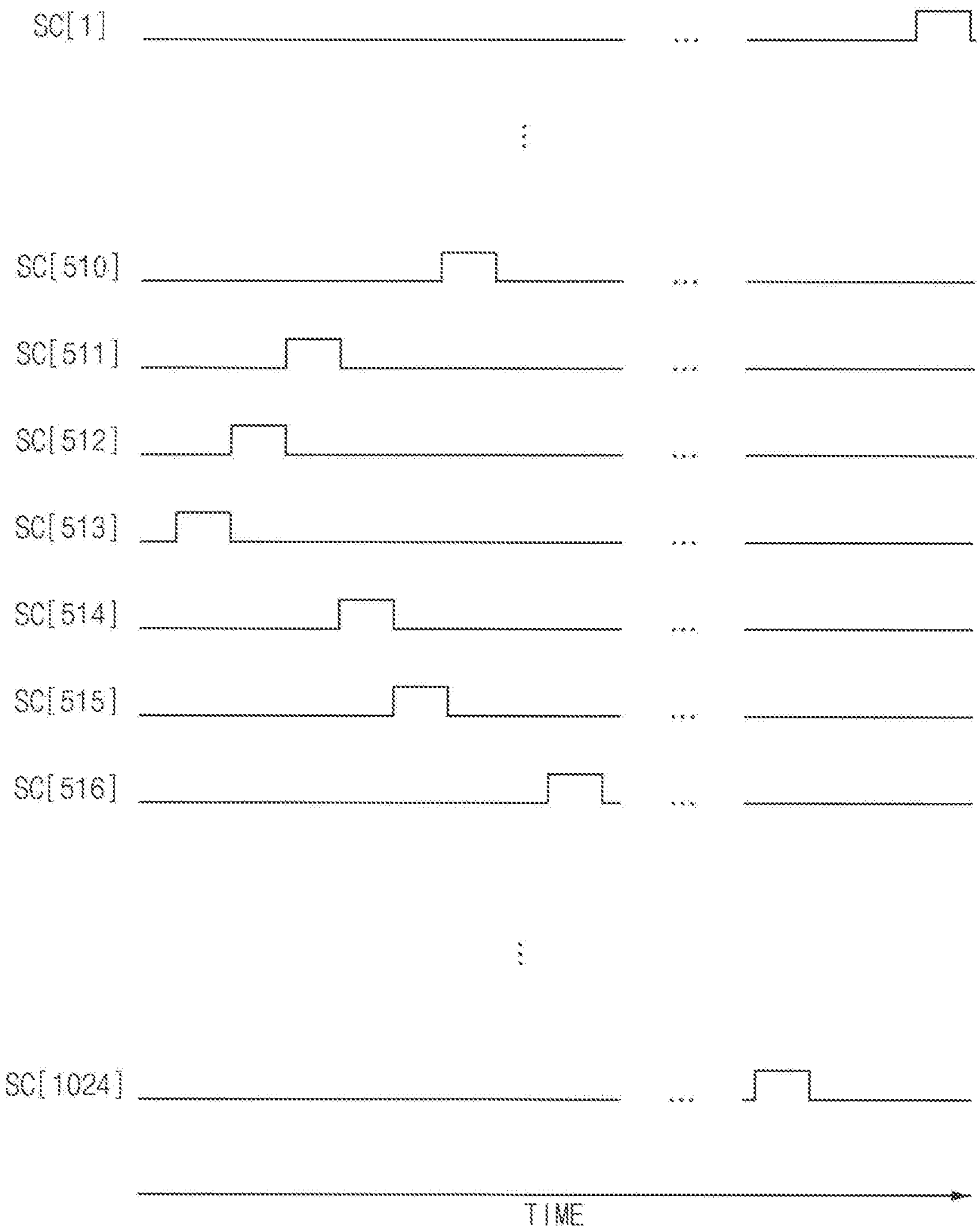
FIG. 7 is a diagram illustrating an example of a scan signal of a display system according to embodiments of the present inventive concept.

FIG. 7 is a diagram illustrating an example of the scan signal SC of a display system according to embodiments of the present inventive concept.

The display system referred to with reference to FIG. 7 is substantially the same as the display system of FIG. 1 except for the scan order SO. Thus, the same reference numerals are used to refer to the same or similar element, and any repetitive explanation will be omitted.

Referring to FIGS. 2 and 7, the display panel driver 1200 may refresh the pixels P according to the scan order SO. In an embodiment, the display panel driver 1200 may first refresh the center pixel row CPR among the pixel rows.

For example, the display panel driver 1200 may provide the scan signals SC to pixels P of the pixel rows. The data voltages may be written to the pixels P in response to the scan signal SC. That is, the pixels P may be refreshed in response to the scan signal SC.

Referring to FIGS. 2 and 4, the center pixel row CPR may be a middle pixel row among the pixel rows. In an embodiment in which the number of the pixel rows is even, the center pixel row CPR may be one of two middle pixel rows.

In an embodiment, when the display panel 1100 may include 1024 pixel rows, the center pixel row CPR may be a 513th pixel row. In an embodiment, when the display panel 1100 includes 1024 pixel rows, the center pixel row CPR may be a 513th pixel row.

The display panel driver may alternately refresh the pixel rows in a first scan direction SD1 and the pixel rows in a second scan direction SD2 opposite to the first scan direction SD1 every N pixel rows, where N is a positive integer, relative to the center pixel row CPR.

For example, the scan signal SC may be first applied to the center pixel row CPR. Also, the scan signal SC may be alternately applied to the pixel rows in the first scan direction SD1 and the pixel rows in the second scan direction SD2 every N pixel rows relative to the center pixel row CPR.

For example, as shown in FIG. 7, the display panel driver 1200 may alternately refresh the pixel rows in a first scan direction SD1 and the pixel rows in a second scan direction SD2 opposite to the first scan direction SD1 every 2 pixel rows relative to the center pixel row CPR. However, embodiments of the present inventive concept are not limited thereto. For example, N may be an integer greater than 2.

Figure 8:
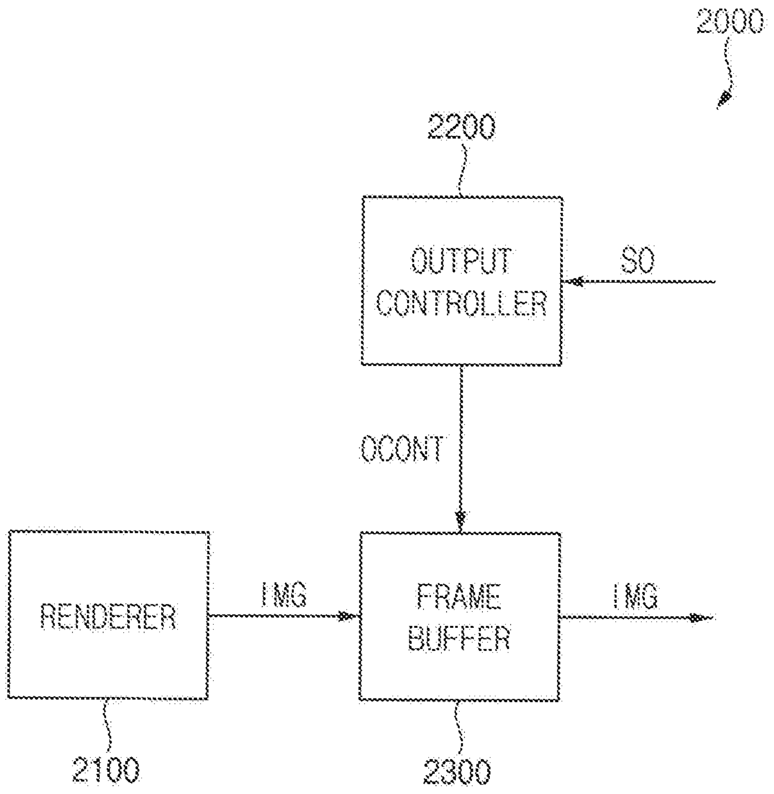
FIG. 8 is a block diagram illustrating an example of a host processor of the display system of FIG. 1.
Figure 9:
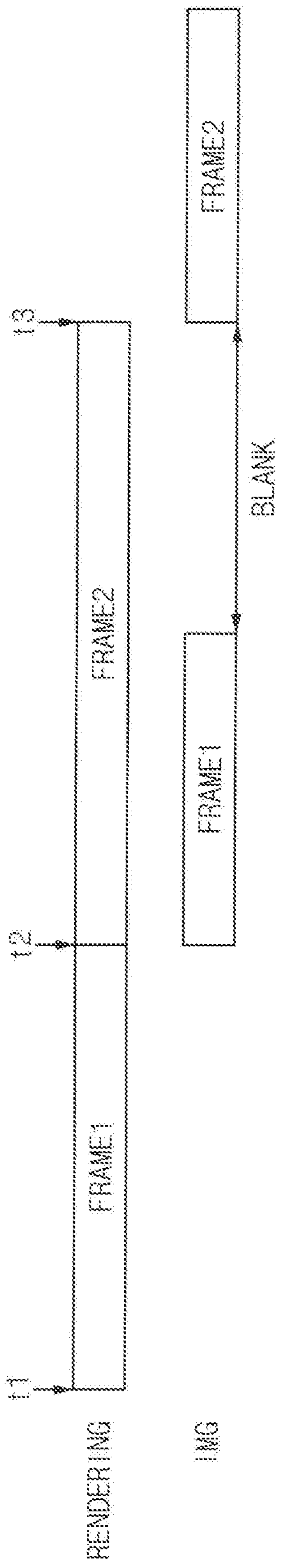
FIG. 9 is a diagram illustrating an example in which the display system of FIG. 1 performs a rendering and outputs frame data according to embodiments of the present inventive concept.

FIG. 8 is a block diagram illustrating an example of the host processor 2000 of the display system of FIG. 1, and FIG. 9 is a diagram illustrating an example in which the display system of FIG. 1 performs a rendering and outputs the frame data IMG.

Referring to FIGS. 1, 2, and 8, the display panel driver 1200 may provide the scan order SO to the host processor 2000. The host processor 2000 may provide the frame data IMG to the display panel driver 1200 using the scan order SO.

The host processor 2000 may include a renderer 2100, an output controller 2200, and a frame buffer 2300.

The renderer 2100 may perform a rendering to generate the frame data IMG and store the frame data IMG in the frame buffer 2300. For example, the renderer 2100 may generate the frame data IMG for an image to be displayed in one frame and store the frame data IMG for the image to be displayed in one frame in the frame buffer 2300.

The output controller 2200 may receive the scan order SO and generate an output control signal OCONT based on the scan order SO. The output controller 2200 may provide the output control signal OCONT to the frame buffer 2300. The output controller 2200 may control an output of the frame buffer 2300 using the scan order SO.

When the rendering is completed, the frame buffer 2300 may store the rendered frame data IMG. The frame buffer 2300 may sequentially provide the frame data IMG stored in the frame buffer 2300 to the display panel driver 1200 according to an output order corresponding to the scan order SO.

The scan order SO may be an order in which the display device 1000 refreshes the pixels P. For example, as shown in FIGS. 3 to 5, the scan order SO may be an order in which the pixel rows in the first scan direction SD1 and the pixel rows in the second scan direction SD2 are alternated, starting from the center pixel row CPR.

The frame buffer 2300 may output the frame data IMG in the same output order as the scan order SO. For example, the frame buffer 2300 may first output the frame data IMG for an image to be displayed by the center pixel row CPR. For example, the frame buffer 2300 may alternately output the pixel rows in the first scan direction SD1 and the pixel rows in the second scan direction SD2 relative to the center pixel row CPR.

According to an embodiment and referring to FIGS. 1, 2, and 9, the display device 1000 may synchronize a driving frequency of the display device 1000 with a rendering frequency of the host processor 2000. For example, the display device 1000 may vary the driving frequency by varying a length of a blank period BLANK in which the data voltages are not written to the pixels P. That is, the display device 1000 may synchronize the driving frequency with the rendering frequency by varying the length of the blank period BLANK in which the frame data IMG is not provided to the display device 1000.

For example, at a first time point t1, the host processor 2000 may start the rendering of the frame data IMG for an image to be displayed in a first frame FRAME1.

For example, at a second time point t2, the host processor 2000 may complete the rendering of the frame data IMG for the image to be displayed in the first frame FRAME1. After the rendering is completed, the host processor 2000 may provide the frame data IMG for the image to be displayed in the first frame FRAME1 to the display device 1000.

For example, at a third time point t3, the host processor 2000 may complete the rendering of the frame data IMG for an image to be displayed in a second frame FRAME2. After the rendering is completed, the host processor 2000 may provide the frame data IMG for the image to be displayed in the second frame FRAME2 to the display device 1000.

After receiving the frame data IMG for the image to be displayed in the first frame FRAME1, the display device 1000 may determine the blank period BLANK as a period until the display device 1000 receives the frame data IMG for the image to be displayed in the second frame FRAME2. Accordingly, the driving frequency of the display device 1000 may be synchronized with the rendering frequency of the host processor 2000.

According to an embodiment, by synchronizing the driving frequency with the rendering frequency, the display device 1000 may prevent a tearing phenomenon in which a boundary line is generated in an image displayed on the display device 1000 due to a mismatch between the driving frequency of the display device 1000 and the rendering frequency of the host processor 2000.

Figure 10:
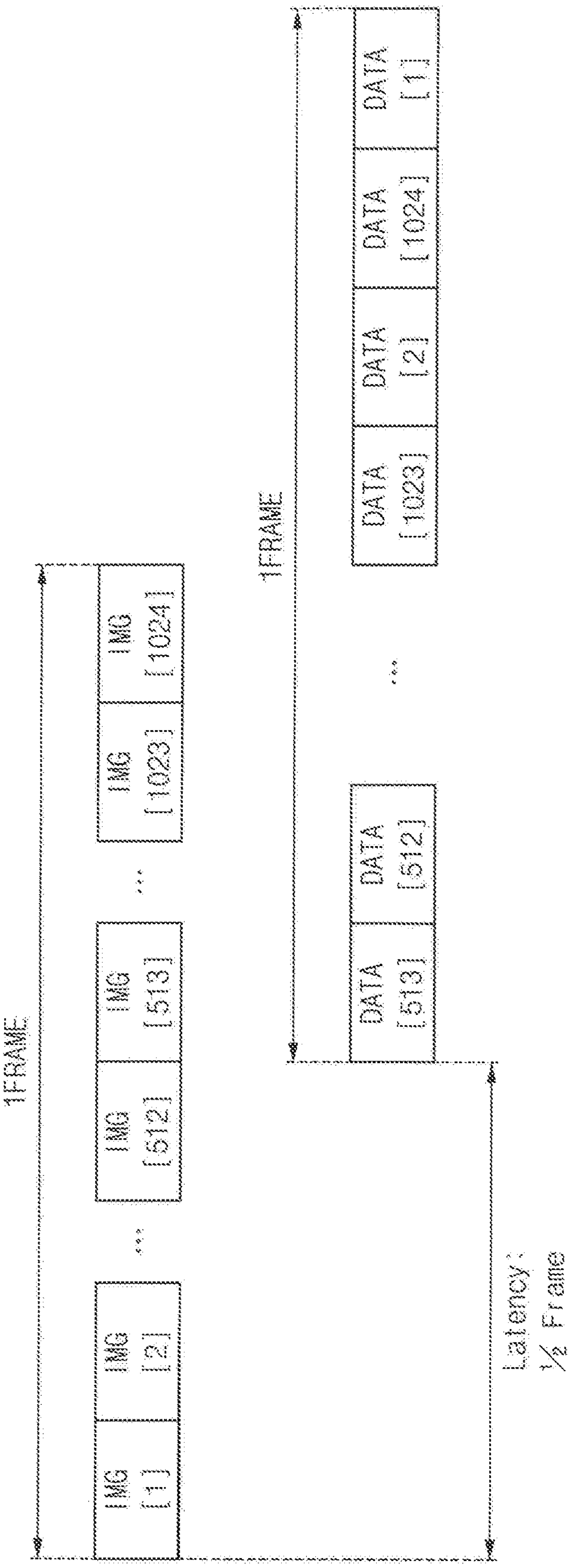
FIG. 10 is a comparative example in which a display system generates a data signal.
Figure 11:
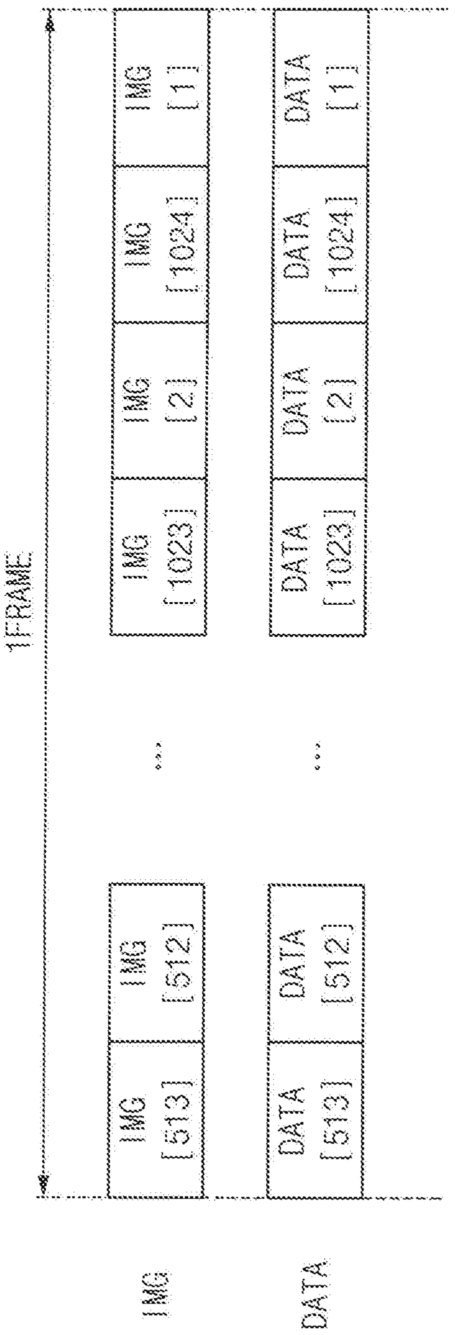
FIG. 11 is a diagram illustrating an example in which the display system of FIG. 1 generates a data signal according to embodiments of the present inventive concept.

FIG. 10 is a comparative example in which a display system generates the data signal DATA. FIG. 11 is a diagram illustrating an example in which the display system of FIG. 1 generates the data signal DATA according to an embodiment. FIGS. 10 and 11 show that the scan order SO is the same as that of FIGS. 3 to 5.

Referring to FIGS. 1 to 5 and 11, the frame buffer 2300 may output the frame data IMG in the same output order as the scan order SO. For example, the frame buffer 2300 may first output frame data IMG for an image to be displayed by the center pixel row CPR. For example, the frame buffer 2300 may alternately output the frame data IMG to the pixel rows in the first scan direction SD1 and the pixel rows in the second scan direction SD2 relative to the center pixel row CPR.

Referring to a comparative example of FIG. 10 in which the output order and the scan order SO are different, the display panel driver 1200 may refresh from the 513th pixel row according to the scan order SO. However, in the comparative example, since the output order of the frame buffer 2300 of the host processor 2000 is different than the scan order SO, the display panel driver 1200 may wait until receiving the frame data IMG for an image to be displayed in the 513th pixel row IMG [513]. The display panel driver 1200 may receive the frame data IMG[513] for an image to be displayed on the 513th pixel row and generate a data signal DATA[513] for an image to be displayed on the 513th pixel row. Accordingly, a latency of ½ frame may occur. As such, when the output order of the frame buffer is different than the scan order SO, latency may affect the display of an image.

As shown in FIG. 11, the frame buffer 2300 according to an embodiment may output the frame data IMG in the same output order as the scan order SO. For example, the frame buffer 2300 may first output the frame data IMG[513] for an image to be displayed in the 513th pixel row according to the scan order SO. The display panel driver 1200 may directly generate a data signal DATA[513] for an image to be displayed on the 513th pixel row with reduced latency (e.g., latency of 1 horizontal time unit).

For example, the frame buffer 2300 may output the frame data IMG[513] for an image to be displayed in the 513th pixel row, and then the frame buffer 2300 may output the frame data IMG[512] for an image to be displayed in the 512th pixel row. The display panel driver 1200 may generate a data signal (DATA[513]) for an image to be displayed in the 513th pixel row, and then the display panel driver 1200 may generate a data signal DATA[512] for an image to be displayed in the 512th pixel row.

For example, the frame buffer 2300 may output the frame data IMG[1023] for an image to be displayed in the 1023th pixel row, and then the frame buffer 2300 may output the frame data IMG[2] for the image to be displayed in the second pixel row. The display panel driver 1200 may generate a data signal DATA[1023] for an image to be displayed in the 1023th pixel row, and then the display panel driver 1200 may generate a data signal DATA[2] for an image to be displayed in the second pixel row.

For example, the frame buffer 2300 may output the frame data IMG[2] for an image to be displayed in the second pixel row, and then the frame buffer 2300 may output the frame data IMG[1024] for an image to be displayed in a 1024th pixel row. The display panel driver 1200 may generate a data signal DATA[2] for an image to be displayed in the second pixel row, and then the display panel driver 1200 may generate a data signal DATA[1024] for an image to be displayed in the 1024th pixel row.

For example, the frame buffer 2300 may output the frame data IMG[1024] for an image to be displayed in the 1024th pixel row, and then the frame buffer 2300 may output the frame data IMG[1] for an image to be displayed in a first pixel row. The display panel driver 1200 may generate a data signal DATA[1024] for an image to be displayed in the 1024th pixel row, and then the display panel driver 1200 may generate a data signal DATA[1] for an image to be displayed in the first pixel row.

According to an embodiment, since the host processor stores the generated frame data (IMG) in the frame buffer (2300 in FIG. 8), latency between scan signals for different pixel lines can be reduced or eliminated in cases where an output order of the scan signals is changed.

Figure 12:
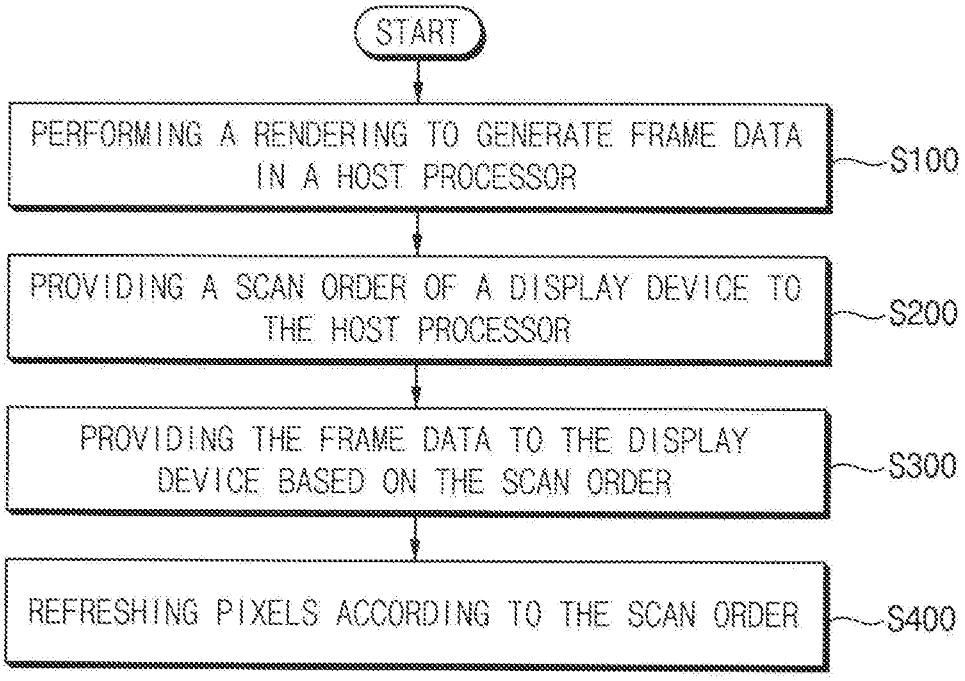
FIG. 12 is a flowchart illustrating a method of driving a display system according to embodiments of the present inventive concept.

FIG. 12 is a flowchart illustrating a method of driving a display system according to embodiments of the present inventive concept.

Referring to FIG. 12, the method of FIG. 12 may include performing a rendering to generate frame data in a host processor (S100), providing a scan order of a display device to the host processor (S200), providing the frame data to the display device using the scan order (S300), and refreshing pixels according to the scan order (S400).

Specifically, the method of FIG. 12 may include providing the scan order of the display device to the host processor (S200), and providing the frame data to the display device using the scan order (S300). The frame data may be sequentially provided to the display device according to an output order corresponding to the scan order.

For example, the host processor may perform the rendering to generate the frame data and store the frame data in a frame buffer. The host processor may sequentially provide the frame data stored in the frame buffer to the display device according to the output order corresponding to the scan order. That is, the frame buffer may output frame data in the same output order as the scan order. Accordingly, the display device may refresh the pixels with almost no latency (e.g., latency of 1 horizontal time unit).

Specifically, the method of FIG. 12 may include refreshing pixels according to the scan order (S400). For example, the display device may first refresh the center pixel row among pixel rows. For example, the display device may alternately refresh the pixel rows in a first scan direction and the pixel rows in a second scan direction opposite to the first scan direction relative to the center pixel row.

For example, the display device may include a gate driver connected to the gate lines and including a plurality of stages sequentially applying the gate signals to refresh the pixels to the gate lines in response to a scan start signal. For example, the scan start signal may be applied to a center stage among the stages. For example, the stages in the first scan direction and the stages in the second scan direction opposite the first scan direction relative to the center stage may alternately output the gate signals to refresh the pixels.

Figure 13:
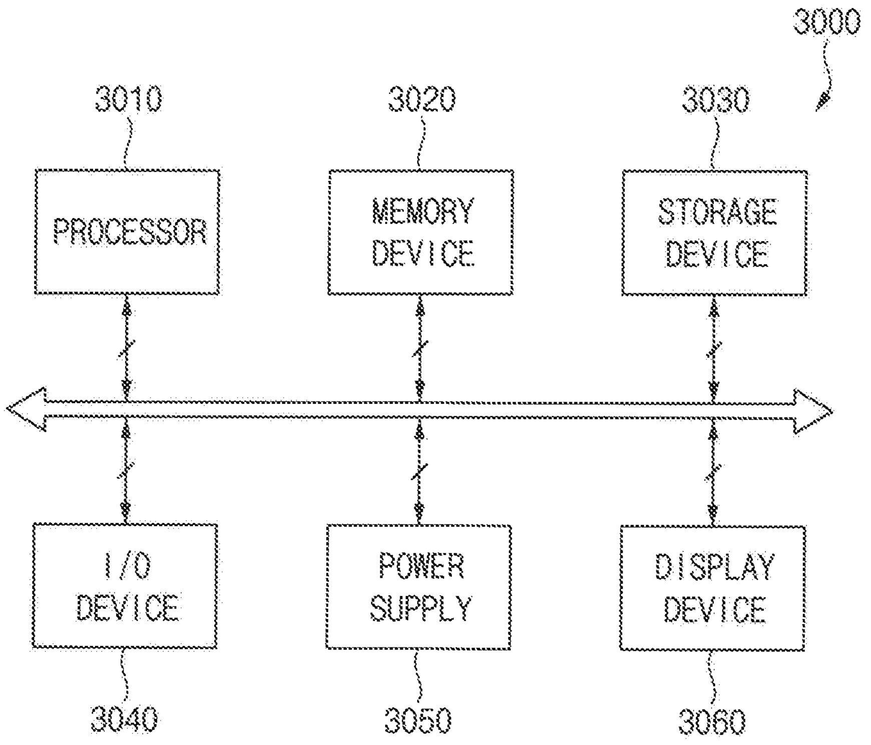
FIG. 13 is a block diagram showing an electronic device according to embodiments of the present inventive concept.
Figure 14:
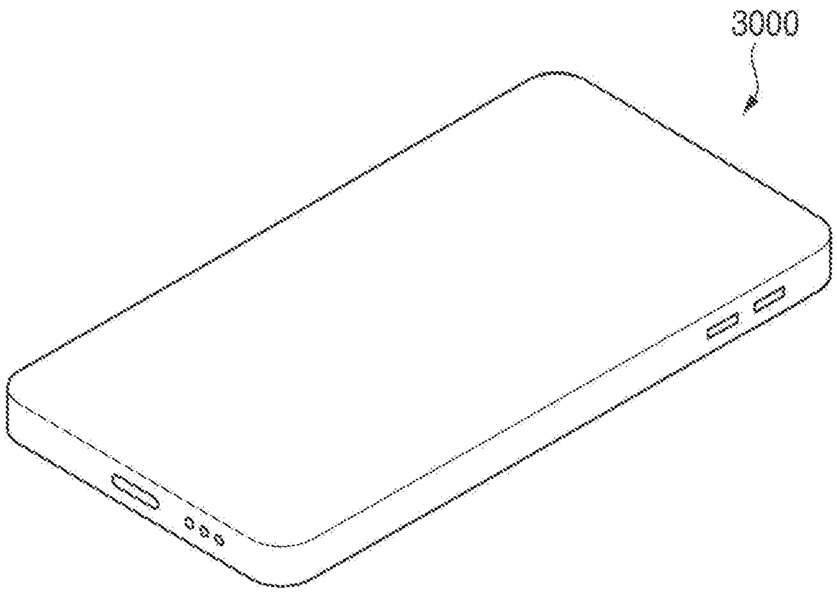
FIG. 14 is a diagram showing an example in which the electronic device of FIG. 13 is implemented as a smart phone according to embodiments of the present inventive concept.

FIG. 13 is a block diagram showing an electronic device 3000 according to embodiments of the present inventive concept, and FIG. 14 is a diagram showing an example in which the electronic device 3000 of FIG. 13 is implemented as a smart phone.

Referring to FIGS. 13 and 14, the electronic device 3000 may include a host processor 3010, a memory device 3020, a storage device 3030, an input/output (I/O) device 3040, a power supply 3050, and a display device 3060. Here, the display device 3060 may be the display device of FIG. 2. In addition, the electronic device 3000 may further include a plurality of ports for communicating with a video card, a sound card, a memory card, a universal serial bus (USB) device, other electronic devices. In an embodiment, as shown in FIG. 14, the electronic device 3000 may be implemented as a smart phone. The electronic device 3000 is not limited thereto. For example, the electronic device 3000 may be implemented as a cellular phone, a video phone, a smart pad, a smart watch, a tablet PC, a car navigation system, a computer monitor, a laptop, a head mounted display (HMD) device, etc.

The host processor 3010 may perform various computing functions. For example, the host processor 3010 may be a micro processor, a central processing unit (CPU), an application processor (AP), etc. The host processor 3010 may be coupled to other components via an address bus, a control bus, a data bus, etc. Further, the host processor 3010 may be coupled to an extended bus such as a peripheral component interconnection (PCI) bus. And, the host processor 3010 may provide the frame data according to the scan order.

The memory device 3020 may store data for operations of the electronic device 3000. For example, the memory device 3020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device. For example, the memory device 3020 may include at least one at least one volatile memory device such as a dynamic random access memory (DRAM) device, a static random access memory (SRAM) device, and a mobile DRAM device.

The storage device 3030 may include a solid state drive (SSD) device, a hard disk drive (HDD) device, a CD-ROM device, etc.

The I/O device 3040 may include an input device such as a keyboard, a keypad, a mouse device, a touch pad, a touch screen, etc. The I/O device 3040 may include an output device such as a printer, a speaker, etc. In some embodiments, the I/O device 3040 may include the display device 3060.

The power supply 3050 may provide power for operations of the electronic device 3000. For example, the power supply 3050 may be a power management integrated circuit (PMIC).

The display device 3060 may display an image corresponding to visual information of the electronic device 3000. For example, the display device 3060 may be an organic light emitting display device or a quantum dot light emitting display device, but is not limited thereto. The display device 3060 may be coupled to other components via the buses or other communication links. Here, the display device 3060 may receive the frame data according to the scan order. Thus, the latency of the display device may be reduced.

Embodiments of the present inventive concepts may be applied to any electronic device including the display device. For example, embodiments of the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments of the present inventive concept and is not to be construed as limiting thereof. Although exemplary embodiments of the present inventive concept have been described, those skilled in the art will readily appreciate that many modifications are possible without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to exemplary embodiments disclosed, and that modifications to disclosed exemplary embodiments, as well as other exemplary embodiments, are intended to be included within the scope of the appended claims. The present inventive concept is defined by the following claims, with equivalents of the claims to be included therein.

What is claimed is:

1. A display system comprising:
- a host processor configured to provide frame data using a scan order provided to the host processor by a display device; and
- the display device comprising:
  - a display panel including pixels; and
  - a display panel driver configured to refresh the pixels using the frame data provided by the host processor and to provide the scan order to the host processor.

2. The display system of claim 1, wherein the host processor is configured to sequentially provide the frame data to the display panel driver according to an output order corresponding to the scan order.

3. The display system of claim 1, wherein the scan order includes a center pixel row first among pixel rows including the pixels.

4. The display system of claim 3, wherein the display panel driver is configured to alternately refresh the pixel rows in a first scan direction and the pixel rows in a second scan direction opposite to the first scan direction relative to the center pixel row.

5. The display system of claim 1, wherein the display panel driver includes:
- a gate driver connected to gate lines and including a plurality of stages configured to sequentially apply gate signals to refresh the pixels of the gate lines in response to a scan start signal.

6. The display system of claim 5, wherein the scan start signal is applied to a center stage among the stages.

7. The display system of claim 6, wherein the stages in a first scan direction and the stages in a second scan direction opposite to the first scan direction relative to the center stage are configured to alternately output the gate signals to refresh the pixels.

8. The display system of claim 1, wherein the host processor further comprises:
- a frame buffer, wherein the host processor is configured to perform a rendering to generate the frame data and to store the frame data to the frame buffer; and
- an output controller configured to receive the scan order from a timing controller of the display panel driver.

9. The display system of claim 8, wherein the host processor is configured to sequentially provide the frame data stored in the frame buffer to the display panel driver in an output order corresponding to the scan order.

10. The display system of claim 1, wherein the display device is configured to synchronize a driving frequency of the display device with a rendering frequency of the host processor.

11. A method of driving a display system comprising:
- performing a rendering to generate frame data in a host processor;
- providing, by a display device, a scan order of the display device to the host processor;
- providing, by the host processor, the frame data to the display device using the scan order; and
- refreshing pixels of the display device according to the scan order.

12. The method of claim 11, wherein providing the frame data comprises sequentially providing the frame data to the display device according to an output order corresponding to the scan order.

13. The method of claim 11, wherein the display device is configured to first refresh a center pixel row among a plurality of pixel rows of the display device.

14. The method of claim 13, wherein the display device is configured to alternately refresh the pixel rows in a first scan direction and the pixel rows in a second scan direction opposite to the first scan direction relative to the center pixel row.

15. The method of claim 11, wherein the display device includes:
- a gate driver connected to gate lines and including a plurality of stages sequentially applying gate signals to refresh the pixels of the gate lines in response to a scan start signal.

16. The method of claim 15, further comprising applying the scan start signal to a center stage among the stages.

17. The method of claim 16, wherein the stages in a first scan direction and the stages in a second scan direction opposite to the first scan direction relative to the center stage alternately output the gate signals to refresh the pixels.

18. The method of claim 11, wherein the host processor is configured to perform a rendering to generate the frame data and to store the frame data to a frame buffer, and to receive, at an output controller of the host processor, the scan order from a timing controller of the display device.

19. The method of claim 18, wherein the host processor is configured to sequentially provide the frame data stored in the frame buffer to the display device in an output order corresponding to the scan order.

20. The method of claim 11, wherein the display device is configured to synchronize a driving frequency of the display device with a rendering frequency of the host processor.

21. A display system comprising:

a host processor having:

an output controller configured to receive a scan order from a display device and generate an output control signal using the scan order; and a frame buffer to store frame data, wherein an output of the frame data by the frame buffer to the display device is controlled by the output controller using the output control signal.

* * * * *